Patented Apr. 1, 1952

2,591,110

UNITED STATES PATENT OFFICE 2,591,110

TREATMENT OF ISOMERIC ESTER MIXTURES

Leonard Weisler, Rochester, N. Y., assignor, by mesne assignments, to Eastman Kodak Company, Rochester, N. Y., a corporation of New Jersey No Drawing. Application April 22, 1949, Serial No. 89,149

5 Claims. (Cl. 260—405.6)

This invention relates to the treatment of mixtures of isomeric esters and is particularly concerned with treatment of mixtures of $\alpha,\beta$-unsaturated polyene esters and desmotropic isomers thereof.

It is an object of this invention to provide an economical and efficient method of separating isomeric esters.

It is a further object of the invention to facilitate synthesis of $\alpha,\beta$-unsaturated completely conjugated esters.

Another object of the invention is to provide a highly effective method of separating an equilibrium ester mixture of a carboxylic acid ester and a desmotropic isomer thereof.

Another object of the invention is to provide means for preparing in high yield completely conjugated $\alpha,\beta$-unsaturated polyene esters such as $\beta$-ionylidene acetic acid esters and isoprenologs thereof.

Another object of the invention is to provide a novel method of treating isomeric mixtures resulting from subjecting a carbonyl compound to a Reformatsky reaction and dehydrating the hydroxy ester produced thereby.

Another object of the invention is to enhance the vitamin A potential of a composition comprising desmotropic esters obtained in the synthesis of vitamin A.

A further object is to provide a commercially feasible method of separating $\beta$-ionylidene acetic acid ester from admixture with a desmotropic isomer thereof.

It is also an object to provide a commercially feasible method for separating an ester of vitamin A acid from admixture with an incompletely conjugated isomer thereof.

Other objects will be apparent from the description and claims which follow.

When a mixture of tautomeric isomers comprising a completely conjugated ester and an incompletely conjugated ester which is a desmotropic isomer thereof is subjected to a saponification reaction, the desmotropic isomer is preferentially saponified to the substantial exclusion of the completely conjugated ester whereby the saponified isomer is readily separated from the unsaponified ester.

In organic syntheses, high yields of a desired compound are often prevented by the formation of an equilibrium system exhibiting dynamic allotropy wherein the desired compound is in admixture with a tautomeric isomer thereof. It is desirable to be able to separate such isomeric mixtures whereby the desired compound may be employed unmixed with an unwanted isomer. It is also desirable to isomerize the unwanted isomer to the desired compound in order to increase the overall yield in the synthesis being effected, and this is readily effected only by removing the unwanted isomer from admixture with the desired compound and providing for re-utilization in the synthesis. The problem is particularly aggravated in a process wherein a mixture of desmotropic organic isomers or as they are sometimes called, prototropic isomers, is obtained, the only difference in the compounds being in the linkages in the molecules with a corresponding migration of hydrogen ions to maintain constant valency.

Thus, for example, esters of alcohol acids are dehydrated either with or without a dehydration catalyst such as iodine or the like to give unsaturated carboxylic acid esters present as mixtures of completely conjugated esters wherein the double bond carbonyl linkage of the ester group is conjugated with the unsaturation of the remainder of the compound in admixture with incompletely conjugated desmotropic isomers of the completely conjugated esters.

Such isomeric mixtures often result from dehydration of a hydroxy ester formed by subjecting an organic carbonyl compound such as an aldehyde or ketone to a Reformatsky reaction with a haloacetate. The isomeric mixture in such case consists of an $\alpha,\beta$-unsaturated carboxylic acid ester and a $\beta,\gamma$-unsaturated desmotropic isomer of such $\alpha,\beta$-unsaturated ester.

Separation of such isomers is effected in accordance with this invention by subjecting the mixture to a saponification reaction whereby the $\beta,\gamma$-unsaturated ester saponifies while the $\alpha,\beta$-unsaturated ester remains unsaponified. The saponified isomer is then readily separated from the unsaponified ester by solvent extraction or other suitable means. The saponified isomer is then re-esterified and isomerized to at least partially convert it to the desired $\alpha,\beta$-unsaturated ester. The saponification, separation, re-esterification and isomerization are preferably repeated successively a plurality of times until substantially all of the $\beta,\gamma$-unsaturated isomer or a substantial proportion thereof is converted and recovered as the desired $\alpha,\beta$-unsaturated ester.

Preferential saponification of such an isomeric mixture is readily effected by heating the mixture with alkali in either aqueous or alcoholic solution. The reaction is preferably effected employing alcoholic alkali and the saponification is carried out at temperatures from about room temperature up to reflux temperature of the alcohol employed, with the reaction desirably being carried out at about 20-35° C.

When alcoholic alkali is employed for saponification, any of the aliphatic alcohols may be employed and desirably the lower saturated aliphatic alcohols, of which alcohols, the lower alkyl alcohols such as methyl, ethyl, n-propyl, isopropyl, butyl alcohol and the like are preferably employed. The alcohol is employed in amounts as low as 0.1 ml. per gram of isomeric mixture or as much as 5 ml., 10 ml. or more per gram of isomeric mixture. If desired, other organic solvents may also be employed in admixture with the alcohol.

The saponification is effected according to well-known practice and preferably employing sodium or potassium hydroxide. The alkali may be added to the isomeric mixture with the alcohol but is preferably added in the form of an aqueous solution. Aqueous solutions of as much as 50% by weight of alkali have been employed and such concentrated solutions are desirably employed although lower concentrations are employed if desired. The alkali preferably amounts to about 10-20% of the weight of the isomeric mixture or more desirably about 20-50% of the weight of incompletely conjugated isomer although greater or lesser amounts are successfully employed. Optimum separation is effected by employing the alkali in amounts of less than 100% excess over stoichiometric amounts based on the weight of incompletely conjugated isomer and preferably not more than 60% excess over stoichiometric amounts and temperatures of 20° C. to 110° C. with reaction times chosen in accordance with the temperature employed of from about 5 minutes to about 1½ hours or as much as 3 hours.

When the saponification reaction is carried out at about room temperature, the reaction mixture is allowed to stand for as much as 1½ hrs. or longer to ensure optimum saponification of the desmotropic incompletely conjugated isomer. The saponification may be speeded up by heating the mixture and the reaction may be carried out at the reflux temperature of the alcohol employed in as little as five minutes. At such elevated temperatures, however, the preferential saponification is less efficacious than at lower reaction temperatures.

The preferential saponification with alkali converts the incompletely conjugated ester to a salt which is readily separated from the unsaponified completely conjugated ester by partial solution. This is preferably effected by extracting the reaction mixture with water in which the saponified isomer is readily soluble leaving the unsaponified fraction containing the completely conjugated ester as a supernatant layer which can be separated by phase decantation or other suitable means. The reaction mixture is desirably extracted simultaneously with water and a substantially water-immiscible organic solvent such as ethyl ether for best separation of the saponified isomer and the unsaponified ester.

The water extract containing the saponified isomer is then acidified to convert the saponified isomer to the corresponding acid. This acid is then re-esterified to give the original incompletely conjugated ester free of the completely conjugated ester.

The re-esterified isomer is isomerized to convert it at least partially to the $\alpha,\beta$-unsaturated ester and the process of saponification and separation repeated. In a cyclic process in which $\alpha,\beta$-unsaturated isomer is withdrawn from the system, substantially complete conversion of the incompletely conjugated ester is effected.

The re-esterification and isomerization are effected in any suitable manner. They are effected simultaneously by reacting the isomeric acid obtained by acidification of the saponified fraction with alcohol in the presence of an acid which catalyzes the isomerization as for example hydrochloric acid, sulfuric acid, benzene sulfonic acid and the like. Any isomerization catalyst effective to labilize conjugated double bonds can be used in effecting isomerization, however, and such catalysts include acids such as phosphoric acid, hydrochloric acid, sulfuric acid, formic acid, p-toluene sulfonic acid and the like as well as such other isomerization catalysts as phosphorous oxychloride, iodine, zinc chloride, oxalyl chloride, phosphorous trichloride, dimethylaniline hydroiodide and the like.

The invention is successfully employed in the preparation of $\alpha,\beta$-unsaturated polyene esters wherein ester mixtures are obtained comprising (1) esters of carboxylic acids having the formula

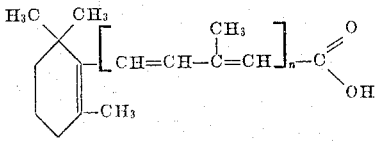

and (2) desmotropic incompletely conjugated isomers of such esters.

The invention is of particular importance in the synthesis of vitamin A, involving compounds in which $n$ in the formula set forth hereinabove is either one or two.

The character of the alcohol radical present in the ester group is not a controlling factor in the process of this invention as I have found from treatment of desmotropic mixtures wherein variously such diverse radicals as methyl, ethyl, benzyl, phenyl, methoxyethyl, phenoxyethyl, ethoxyethyl and butoxyethyl were present. For the sake of simplicity, the lower alkyl esters such as methyl, ethyl and propyl esters are desirably employed although the process of the invention is equally applicable to isomeric ester mixtures wherein any ester group is present.

The invention may be illustrated by reference to examples of specific embodiments thereof.

Example 1

$\beta$-Ionylidene ethyl acetate was prepared by reacting 96 g. of $\beta$-ionone with 96 g. of ethyl bromoacetate in the presence of 37.6 g. of zinc and a crystal of iodine in accordance with the Reformatsky reaction to give a hydroxy ester, $\beta$-ionolacetic acid ethyl ester, and then refluxing the hydroxy ester in benzene in the presence of a crystal of iodine causing dehydration of the hydroxy ester to an isomeric mixture of $\alpha,\beta$-unsaturated $\beta$-ionylidene ethyl acetate and the $\beta,\gamma$-unsaturated desmotropic isomer.

Twenty grams of isomeric ester mixture prepared in this manner and comprising 52% $\alpha,\beta$-unsaturated ester by infrared and ultraviolet absorption analysis $$(E^{1\%}_{1\,cm.}(284\,m\mu)=734)$$

was dissolved in 64 ml. of ethanol and 3.3 g. of potassium hydroxide dissolved in 3.3 g. of water added to the resulting solution. The mixture was stirred and allowed to stand for 1½ hours at room temperature. The reaction mixture was then diluted with four volumes of water. The unsaponified fraction was extracted with ether, and the ether extract, after evaporation of the ether, weighed 10.8 g. and comprised 95% α,β-unsaturated ester by infrared absorption and 92% by ultraviolet absorption $$(E_{1cm.}^{1\%}(304\ m\mu) = 476)$$

The aqueous phase was acidified to convert the saponified isomer to the corresponding β,γ-unsaturated acid which was recovered in 96.5% yield $$(E_{1cm.}^{1\%}(284\ m\mu) = 1065)$$

It is thus evident that the isomeric mixture was substantially completely separated into the respective α,β- and β,γ-unsaturated desmotropic isomers by means of this invention. Similar results were obtained when saponification was effected employing methyl, isopropyl and n-propyl alcohols respectively in place of the ethyl alcohol.

The β,γ-unsaturated acid obtained by acidification of the aqueous extract and amounting to 8.6 g. was dissolved in 35 ml. of ethyl alcohol containing 0.5 g. of hydrogen chloride per 100 ml. of alcohol. The resulting solution was allowed to stand at room temperature for two hours to effect re-esterification and isomerization of the β,γ-unsaturated acid. The resulting isomeric mixture was saponified as before, using 1.5 g. of potassium hydroxide dissolved in 1.5 ml. of water. The unsaponified fraction weighed 3.95 g. and comprised 95% α,β-unsaturated ester by infrared analysis $$(E_{1cm.}^{1\%}(304\ m\mu) = 505)$$

The yield of α,β-unsaturated β-ionylidene ethyl acetate in a single cycle was thus increased from 52% to 67% and it was obtained substantially free of β,γ-unsaturated ester. Further recycling of the unconverted β,γ-unsaturated isomer gives corresponding increases in yield of the desired α,β-unsaturated ester and yields in excess of 90% are attainable by a cyclic process.

*Example 2*

A mixture of α,β-unsaturated vitamin A acid ethyl ester and β,γ-unsaturated isomer of vitamin A acid ethyl ester was separated in accordance with this invention by dissolving 7.7 g. of mixed ester composition (55% α,β-unsaturated ester, 45% β,γ-unsaturated ester, $$(E_{1cm.}^{1\%}(348\ m\mu) = 925)$$

in 21 ml. of isopropyl alcohol. To the resulting solution was added 1.1 g. of potassium hydroxide dissolved in 1 ml. of water and the mixture was shaken and allowed to stand at room temperature for 1½ hrs. The saponified and unsaponified fractions were separated as in Example 1. The unsaponified fraction contained 85% α,β-unsaturated vitamin A acid ethyl ester and weighed 4.4 g. The β,γ-unsaturated vitamin A acid obtained by acidification of the saponified fraction weighed 3.0 g. and had $$(E_{1cm.}^{1\%}(348\ m\mu) = 1450)$$

*Example 3*

Three grams of β,γ-unsaturated isomer of vitamin A acid were dissolved in 12 ml. of 1% hydrogen chloride-methanol and the resulting solution was refluxed for 30 minutes to effect esterification and isomerization. The resulting mixed ester composition was saponified by reacting it with 1 ml. of a 50% aqueous solution of sodium hydroxide. The unsaponified fraction obtained thereby weighed 1.5 g. and comprised 85% α,β-unsaturated vitamin A acid methyl ester.

Similar results are obtained with other desmotropic ester mixtures. Thus, by means of this invention, desmotropic esters are readily separated from each other. Incompletely conjugated esters are converted to completely conjugated esters in good yield by separation of equilibrium isomeric mixtures and isomerization of the incompletely conjugated isomers unmixed with the desired completely conjugated esters. High yields are made possible in organic syntheses wherein such isomeric mixtures are formed during the process.

The invention has been described in considerable detail with reference to certain preferred embodiments thereof but it will be understood that other isomeric ester mixtures may be treated and the conditions of treating such mixtures may be varied or modified within the spirit and scope of the invention as set forth hereinabove and defined in the appended claims.

What I claim is:

1. In the synthesis of vitamin A wherein an ionylic hydroxy ester is dehydrated to form a mixture of a desired completely conjugated ester and an undesirable desmotropic isomer of said completely conjugated ester, the method of treating said mixture to separate said ester from said isomer and to obtain said isomer in form suitable for isomerization which comprises subjecting a mixture of (1) an ester of an acid having the formula

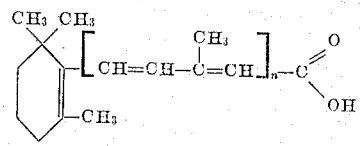

in which n is a whole integer not greater than 2 and (2) a desmotropic isomer thereof to a saponification reaction with alkali and thereby converting said desmotropic isomer to an acid salt without substantially saponifying said first-named ester, said saponification reaction being effected under correlated time and temperature conditions within the range of from five minutes at 110° C. to three hours at 20° C. and employing said alkali in an amount less than 100% excess over the stoichiometric amount based on the weight of said desmotropic isomer, extracting said saponified desmotropic isomer from admixture with said first-named ester, and re-esterifying said saponified desmotropic isomer and thereby reconstituting said desmotropic isomer substantially free of said first-named ester.

2. In the cyclic process of obtaining in the synthesis of vitamin A a desired ester of an acid having the formula

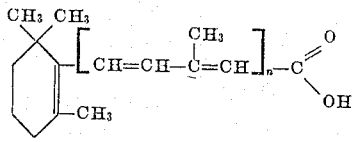

in which n is a whole integer not greater than 2 by isomerizing a desmotropic isomer of said desired ester to at least partially convert said desmotropic isomer to the desired ester and repeating said isomerization of unconverted desmotropic isomer, the step of separating the desired ester from admixture with the desmotropic isomer thereof, said separating being effected by subjecting said admixture to a saponification reaction effected under correlated time and temperature conditions within the range of from five minutes at 110° C. to three hours at 20° C. and employing alcoholic alkali in an amount such that the alkali is present in an amount of less than 100% excess over stoichiometric amounts based on the weight of said desmotropic isomer and thereby preferentially saponifying said desmotropic isomer, and thereafter extracting the mixture resulting from said reaction with a preferential solvent effective to separate said saponified isomer from said desired ester.

3. In the synthesis of vitamin A, the process of obtaining β-ionylidene acetic acid ester in improved yield and substantially free of isomers of said ester which comprises subjecting a mixture of β-ionylidene acetic acid ester and a desmotropic isomer thereof obtained in the synthesis of vitamin A to a saponification reaction effective to preferentially saponify said desmotropic isomer, said saponification reaction comprising treating said mixture with alkali in an amount of less than 100% excess over the stoichiometric amount based on the weight of said desmotropic isomer and under correlated time and temperature conditions within the range of from five minutes at 110° C. to three hours at 20° C., separating said saponified desmotropic isomer from the unsaponified β-ionylidene acetic acid ester, re-esterifying said saponified desmotropic isomer and isomerizing said re-esterified desmotropic isomer to convert at least a portion of said re-esterified isomer to β-ionylidene acetic acid ester, and repeating said saponifying, separating, re-esterifying and isomerizing until a substantial proportion of the original mixture is recovered as β-ionylidene acetic acid ester.

4. The method of enhancing the vitamin A potential of a composition obtained in the synthesis of vitamin A by dehydration of an ester of an alcohol acid and comprising vitamin A acid ester in admixture with a substantial proportion of a desmotropic isomer thereof which comprises subjecting said composition to a saponification reaction with alcoholic alkali under correlated time and temperature conditions within the range of from five minutes at 110° C. to three hours at 20° C. and employing said alkali in an amount of less than 100% excess over the stoichiometric amount based on the weight of said desmotropic isomer and thereby converting said desmotropic isomer to a salt without substantially affecting said vitamin A acid ester, separating said salt from said ester by solvent extraction, and thereafter re-esterifying and isomerizing said saponified desmotropic isomer to convert a substantial proportion thereof to vitamin A acid ester.

5. The method of treating a composition obtained in the synthesis of vitamin A by dehydration of an ester of an alcohol acid and comprising (1) an ester of an acid having the formula

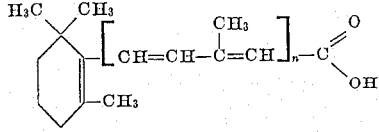

wherein $n$ is a whole integer not greater than 2 and (2) a desmotropic isomer of said ester (1) which comprises subjecting said composition to a saponification reaction with alcoholic alkali under correlated time and temperature conditions within the range of from five minutes at 110° C. to three hours at 20° C. and employing said alkali in an amount not greater than 60% excess over stoichiometric amount based on the weight of said desmotropic isomer and thereby saponifying said desmotropic isomer to the substantial exclusion of said ester (1), extracting said saponified isomer with water leaving an unsaponified oil fraction containing said unsaponified ester (1), acidifying said water extract and thereby converting said saponified isomer to the corresponding acid, effecting re-esterification and isomerization of said resulting acid with alcoholic hydrogen chloride and thereby forming a new mixture of said ester (1) and said desmotropic isomer thereof, said treating being repeated until a substantial proportion of the original desmotropic isomer is converted to said ester (1).

LEONARD WEISLER.

REFERENCES CITED

The following references are of record in the file of this patent:

UNITED STATES PATENTS

| Number | Name | Date |
| --- | --- | --- |
| 2,424,994 | Milas | Aug. 5, 1947 |

OTHER REFERENCES

Arens et al.: "Nature," vol. 157, February 1946, pages 190–191.

Van Doop et al.: Rec. des Trav. Chim. des Pays-Bas, vol. 65, No. 6, pages 338–345 (1946).

McCollum et al.: J. Biol. Chem., vol. 19, pages 245–250 (1914).